United States Patent [19]

Mosey

[11] Patent Number: 5,293,794
[45] Date of Patent: Mar. 15, 1994

[54] TURNING AND BORING MACHINE FOR RINGS

[76] Inventor: George N. Mosey, 1912 Morrow Rd., Richmond, Ind. 47374

[21] Appl. No.: 24,623

[22] Filed: Mar. 1, 1993

[51] Int. Cl.$^5$ .................... B23B 5/26; B23B 15/00
[52] U.S. Cl. .......................... 82/125; 82/142; 82/165
[58] Field of Search .............. 82/117, 124, 125, 142, 82/147, 165

[56] References Cited

U.S. PATENT DOCUMENTS

| | | | |
|---|---|---|---|
| 3,707,101 | 12/1972 | Werth | 82/125 |
| 3,756,099 | 9/1973 | Sullivan | 82/125 |
| 3,913,751 | 10/1975 | Friedman | 82/125 |
| 3,948,121 | 4/1976 | Shaumian et al. | 82/125 |
| 3,995,524 | 12/1976 | Lederer | 82/125 |
| 4,013,176 | 3/1977 | Lohneis et al. | 82/125 |
| 4,125,043 | 11/1978 | Leutgab | 82/170 |
| 4,141,263 | 2/1979 | Leutgab | 82/165 |
| 4,250,779 | 2/1981 | Feller et al. | 82/118 |
| 4,347,770 | 9/1982 | Mosey et al. | 82/90 |
| 5,077,876 | 1/1992 | McConkey | 82/142 |

Primary Examiner—William E. Terrell
Attorney, Agent, or Firm—Woodard, Emhart, Naughton, Moriarty & McNett

[57] ABSTRACT

A machine for simultaneously turning and boring a ring-shaped workpiece has a frame of four parallel structural shafts secured between end stands. An active spindle assembly is mounted on a carriage slidably mounted on the shafts. The carriage is hydraulically drivable axially toward a stop cylinder of a passive spindle assembly rotatably mounted but axially immovable on one stand, to clamp the workpiece ring between a clamp cylinder of the active spindle assembly and the stop cylinder. The clamp cylinder is rotatable by the main machine drive motor for turning the workpiece. The workpiece ring is introduced laterally to the working area by a loader shuttle. Then the workpiece is centered in the work space by an axially drivable centering crescent as the workpiece is clamped in position between the clamp cylinder and stop cylinder for the turning to commence. Cylindrical slides and slideways are provided at right angles for both radial and axial movement of the external turning tool mounting bar. Cylindrical slides at right angles to each other are also provided for radial and axial movement of a boring bar. The finished workpiece moves into a gage which simultaneously measures the inside diameter with a pyramidal plug, and the outside diameter between a stop and a wedge, the wedge and plug being operated by linear actuators driving rotary encoders providing signals useful in a computer for control of the slide drive screws for automatic adjustment if and as needed in response to measured deviations from a standard.

26 Claims, 17 Drawing Sheets

TURNING AND BORING MACHINE FOR RINGS

BACKGROUND OF THE INVENTION

1. Field of the Invention

This invention relates generally to machine tools, and more particularly to a turning machine which simultaneously removes material from both the outer and inner cylindrical surfaces of rings.

2. Description of the Prior Art

A conventional practice for machining rings has been to use a chucker which grips the inner cylindrical surface of a ring while it machines material off the outer cylindrical surface, or grips the outer cylindrical surface while it machines material from the inner cylindrical surface. The use of such machines requires that, before the workpiece is gripped, some reasonable effort be made to clean the gripped surface and the grippers themselves so as to be sure that the workpiece is properly positioned and centered on the axis of the turning machine. After either the outer surface has been machined or the inner surface has been machined, a part handling step is required in addition to the step of cleaning the other surface to be gripped and the grippers to grip it.

Several of the above-mentioned steps can be eliminated by using a machine which, instead of gripping the outer cylindrical surface or the inner cylindrical surface, clamps the ring between the edges, and machines both the inside diameter (I.D.) and the outside diameter (O.D.) simultaneously. But such machines as known to me prior to the present invention, have relied on a double armed pick-up and placing device to place the ring in position to be machined, and center it, and remove the ring from the machine when the machining is finished. In addition, it has not been feasible to remove the boring tool from the workpiece without leaving some mark on the surface. Also, it has been necessary to gauge the machined part manually. Therefore, it is desirable to overcome these problems associated with the prior art equipment.

SUMMARY OF THE INVENTION

Described briefly, according to a typical embodiment of the present invention, a turning and boring machine is provided with a frame structure comprising four parallel structural rods secured between end stands. A workpiece clamp slide is mounted and guidedly slidable on the rods. It supports an active driving spindle for rotating the workpiece on a turning axis. The clamp slide is hydraulically drivable axially toward a passive (driven) spindle stop rotatably mounted but axially immovable on one of the stands, to clamp the workpiece between the two spindles. The driving spindle is rotatable by the main machine drive motor for turning the workpiece. A workpiece in the form of a ring is introduced laterally to the working area by a loader. Then the workpiece is centered in the work space by a hydraulically drivable, axially driven centering crescent which keeps the ring centered on the machine turning axis as the workpiece is clamped in position between the driving spindle and driven spindle for the turning to commence. Cylindrical slides and slideways are provided at right angles for both radial and axial movement of the external tool mounting bar. Cylindrical slides at right angles to each other are also provided for radial and axial movement of the boring bar. Drive of the slides is provided by lead screws. The finished workpiece enters a gage which simultaneously measures the inside diameter with a pyramidal plug, and the outside diameter between a stop and a wedge, the wedge and plug being operated by linear actuators and driving rotary encoders for providing digital signals indicative of linear distance moved. This information can be inputted to a conventional computer for control of the slide drive screws for automatic adjustment if and as needed in response to measured deviations from a standard, when adjustment is dictated after computer analysis of a pattern of deviations according to generally known and accepted statistical process control analysis procedures.

DESCRIPTION OF THE PREFERRED EMBODIMENT

Figure 1:
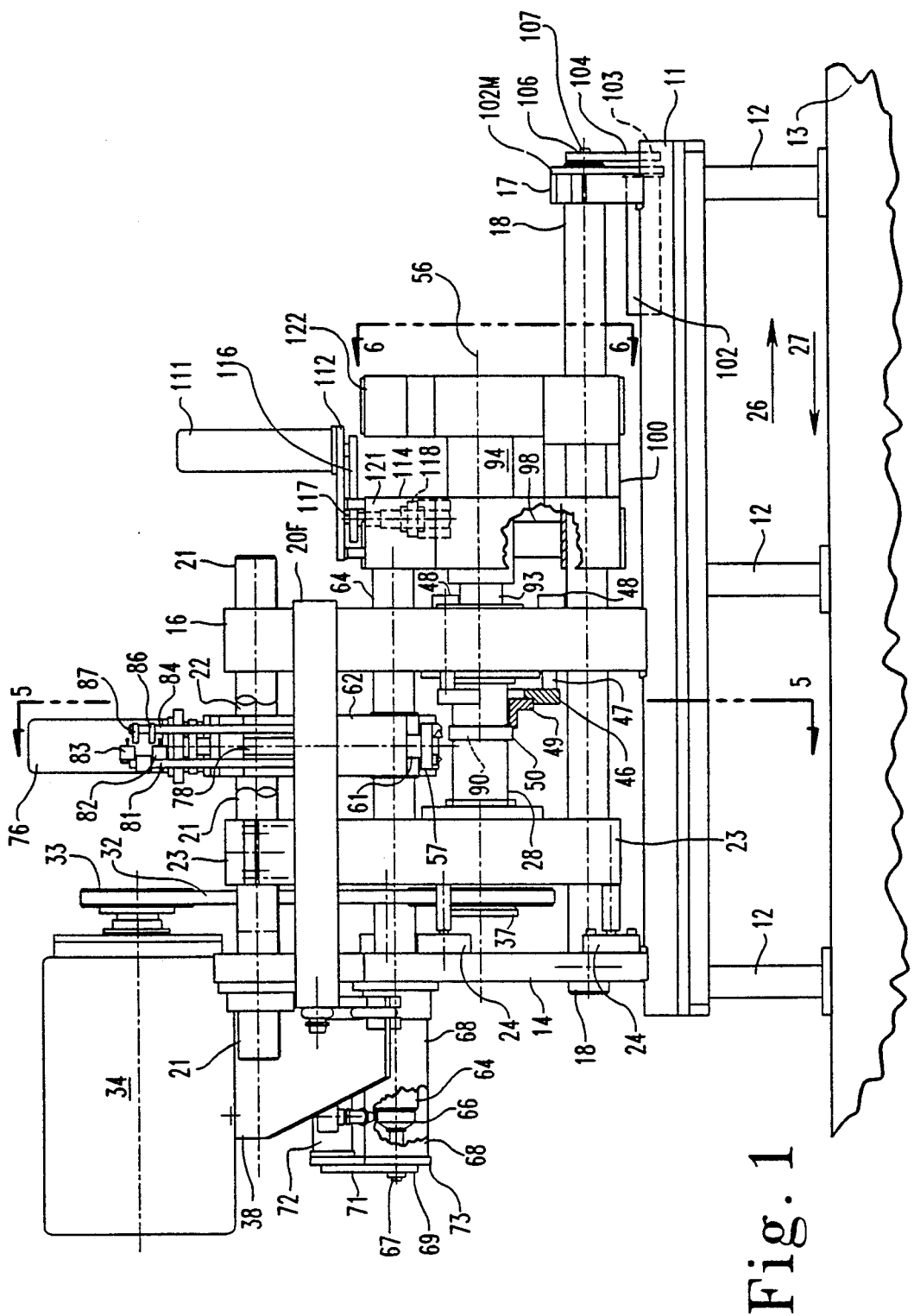
FIG. 1 is a front elevational view of a turning and boring machine according to a typical embodiment of the present invention.
Figure 2:
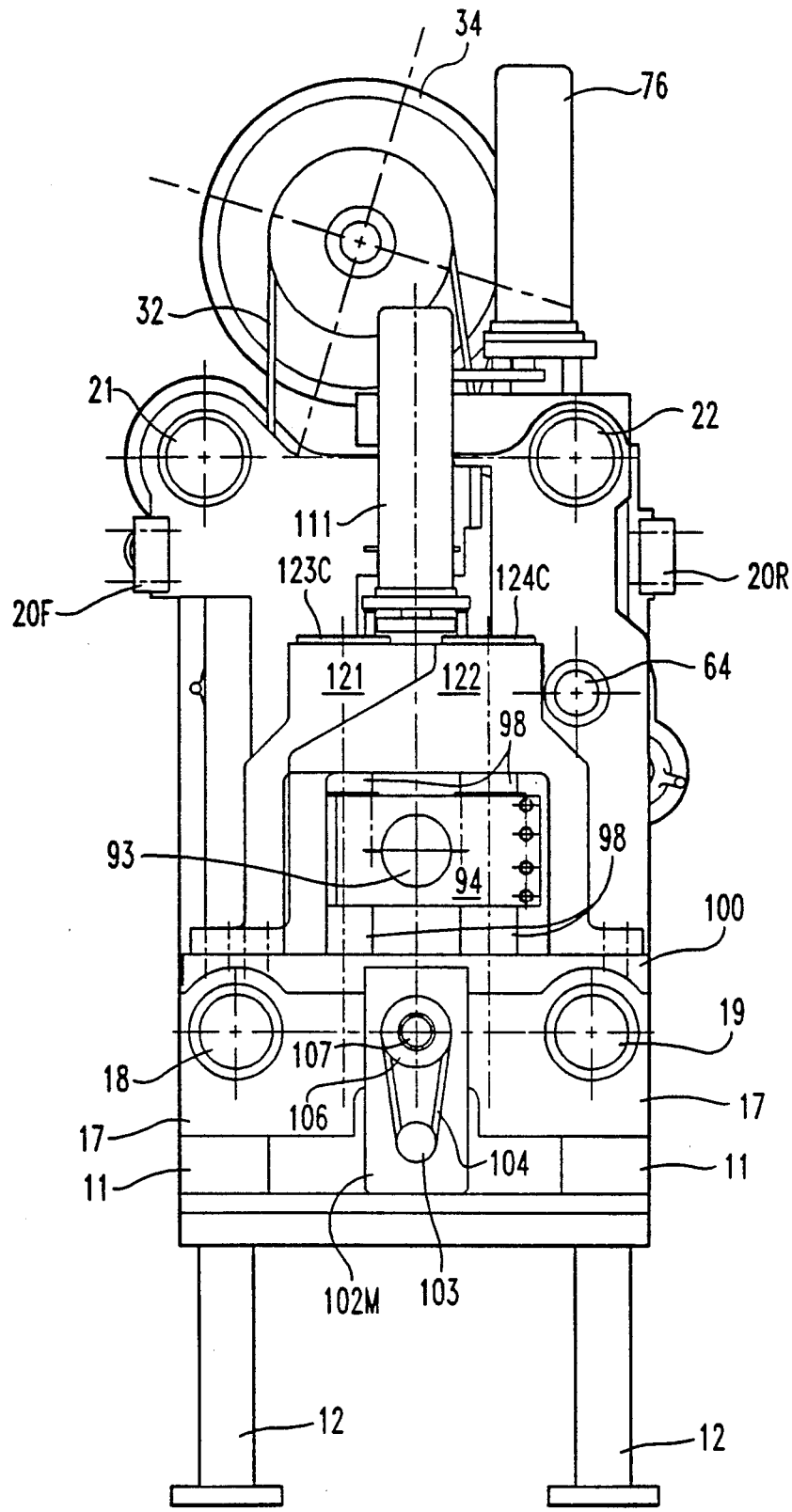
FIG. 2 is a right-hand elevational view thereof.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the machine includes a base mounting plate 11 which stands on six legs 12 which are set on floor 13. Three stands 14, 16 and 17 are received in notches, wedged and bolted and thereby fixed to the base. They support two cylindrical lower structural bars 18 and 19. There are front and rear upper tie bars 20F and 20R, respectively, which are of rectangular cross section, fittingly received and wedged tight in outwardly opening notches in stands 14 and 16, and bolted to these stands. The two stands 14 and 16 also support two upper cylindrical structural bars 21 and 22. The six bars and three stands form a rigid framework on which other features of the machine are mounted.

A clamp plate 23 has four apertures therein with ceramic coated sleeve bearings slidably received on the four bars 18, 19, 21 and 22. There are three double acting hydraulic actuators 24 (two of them as shown in FIG. 1) fixed to the stand 14 and having their output members connected to the clamp plate 23 to drive it to the right and left int he $Y_1$-axis direction of arrows 26 and 27, respectively. A cylindrical driver-gripper clamp cylinder 28 is fastened to a driving spindle assembly 29 (FIG. 7) which is mounted in ball and tapered roller bearings in the clamp plate 23 and extends out the left-hand side of the plate and receives a gear belt sprocket 31 which is keyed thereon. This sprocket receives the gear belt 32 driven by sprocket 33 on the spindle drive motor 34. A rotary encoder belt drive sprocket 36 is fastened to the left-hand end of the driving spindle assembly 29 and receives the encoder belt 37 thereon.

Figure 3:
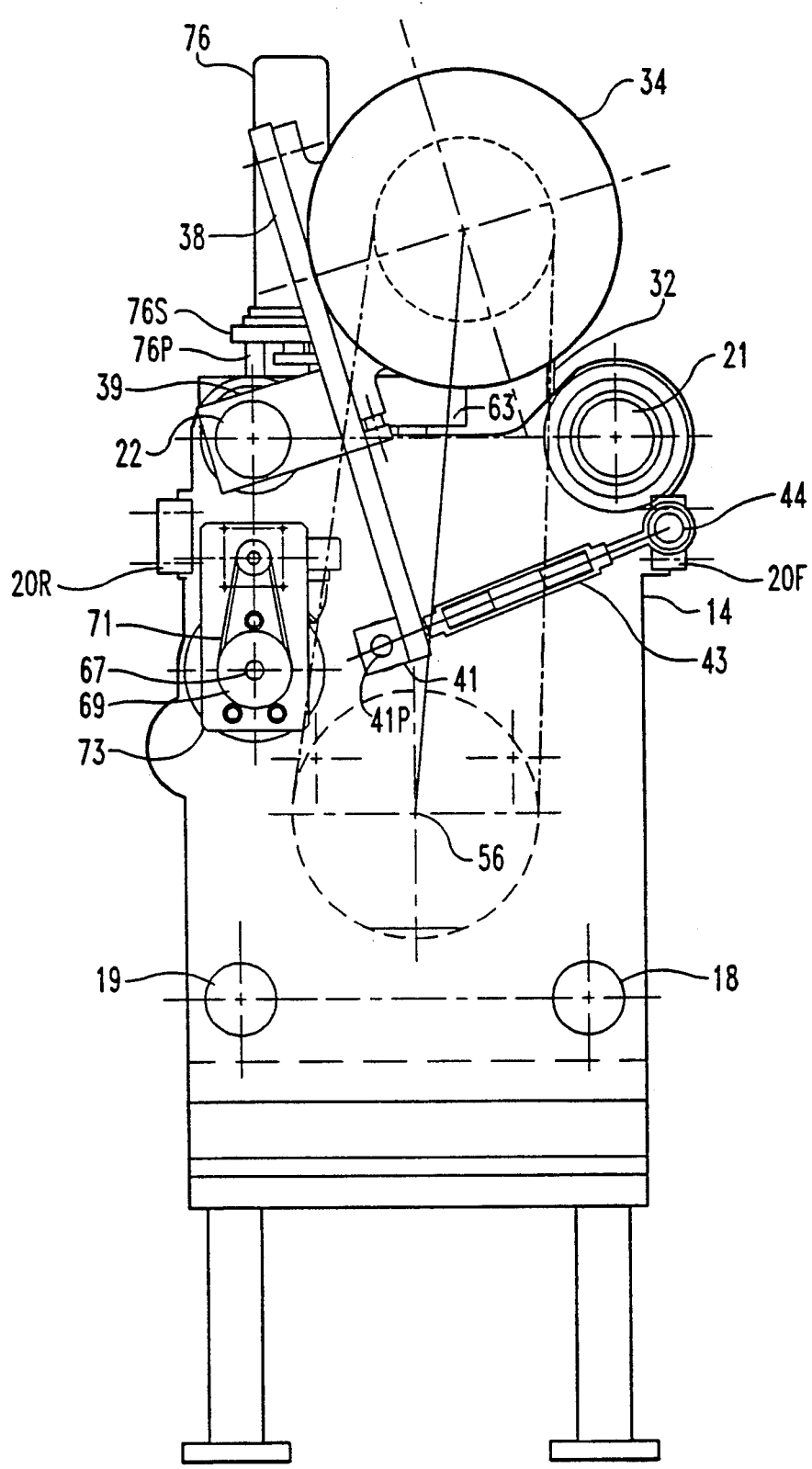
FIG. 3 is a left-hand elevational view thereof.

The motor 34 is secured to a motor mounting plate 38 having a bracket portion 39 (FIG. 3) formed thereon and which is pivotally mounted on the left-hand end extension of frame bar 22. The lower end of motor mounting plate 38 has rearwardly extending brackets 41 having a pin 41P therethrough receiving the connector eye 42 of a turnbuckle assembly 43 having its upper end eye pinned at 44 to the left-hand end of the tie bar 20F. This assembly is useful to adjust the tension of the spindle drive belt 32.

Referring further to FIG. 1, there is a workpiece positioner mounting plate 46 mounted to locator support rods 47 connected to three double acting hydraulic actuators 48 (FIGS. 1 and 7) circularly spaced and fastened to the stand 16. Plate 46 has a positioner 49 (FIG. 7) fastened to it and which has a chamfer 51 providing a lead-in and guiding surface for the workpiece when the clamping plate is advanced in the direction of arrow 26 as will be described hereinafter.

Since this machine is a turning and boring machine, it will be helpful to know that the workpiece for which this machine is intended is a ring 50 which may be later made into a bearing race or the like. It is first cut from seamless tubing by sawing it on a machine such as the saw disclosed in U.S. Pat. No. 4,347,770 issued Sep. 7, 1982. That saw is capable of simultaneously cutting a length of seamless tubing into a plurality of essentially identical rings whose end faces are rather precisely parallel. Those rings may then be loaded into a chute 52 and from which they descend into feeder 53 (FIG. 5) which transports the rings, one-at-a-time from the chute exit on the far side of the machine in the direction of arrow 54 (FIG. 5) to the center line 56 of the drive gripper 28 where the feeder will stop the ring, enabling it to be located, centered, gripped and machined as will be described hereinafter.

Figure 5:
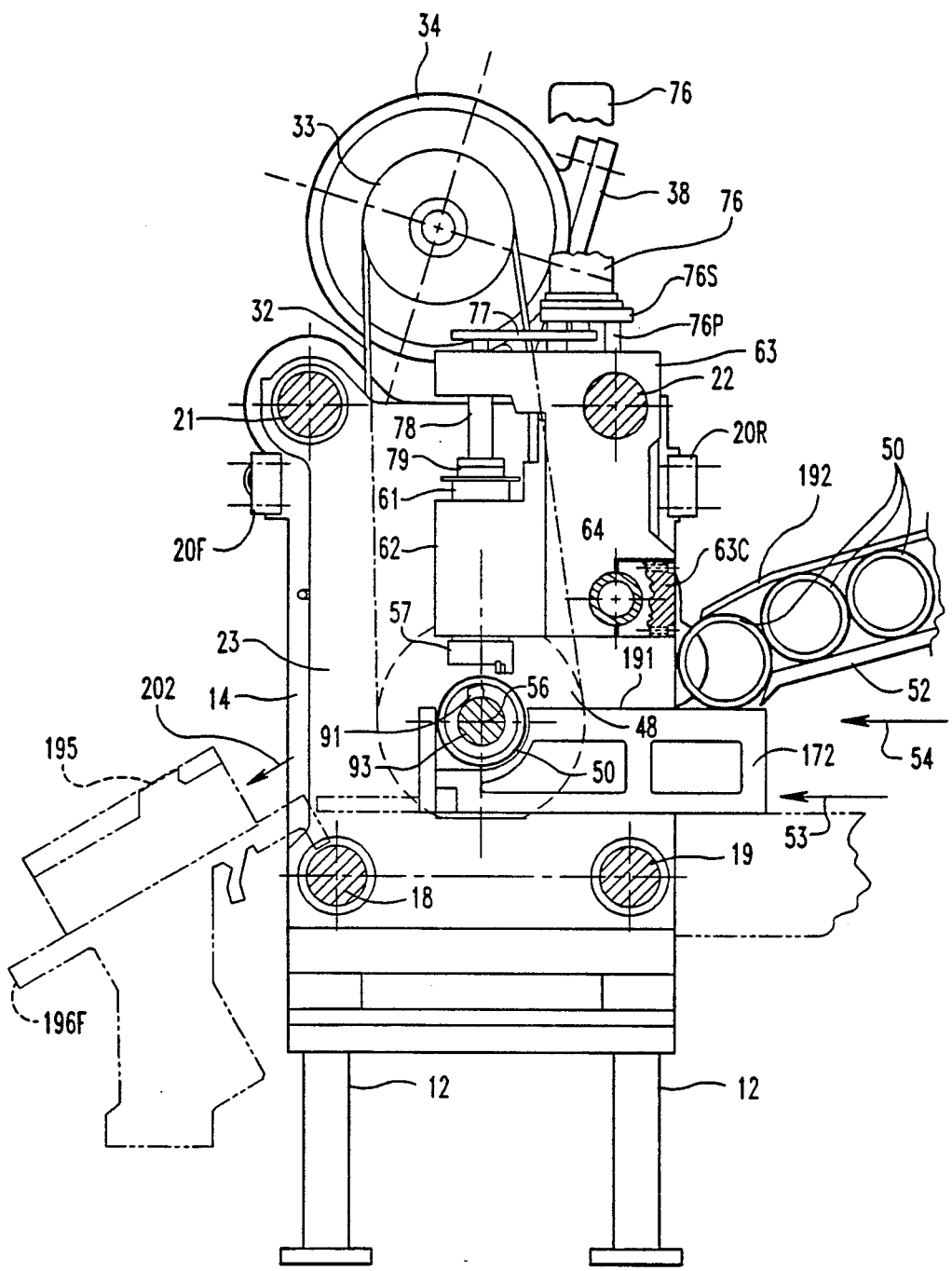
FIG. 5 is a vertical section taken immediately adjacent the workpiece at line 5—5 in FIG. 1 and viewed in the direction of the arrows.
Figure 7:
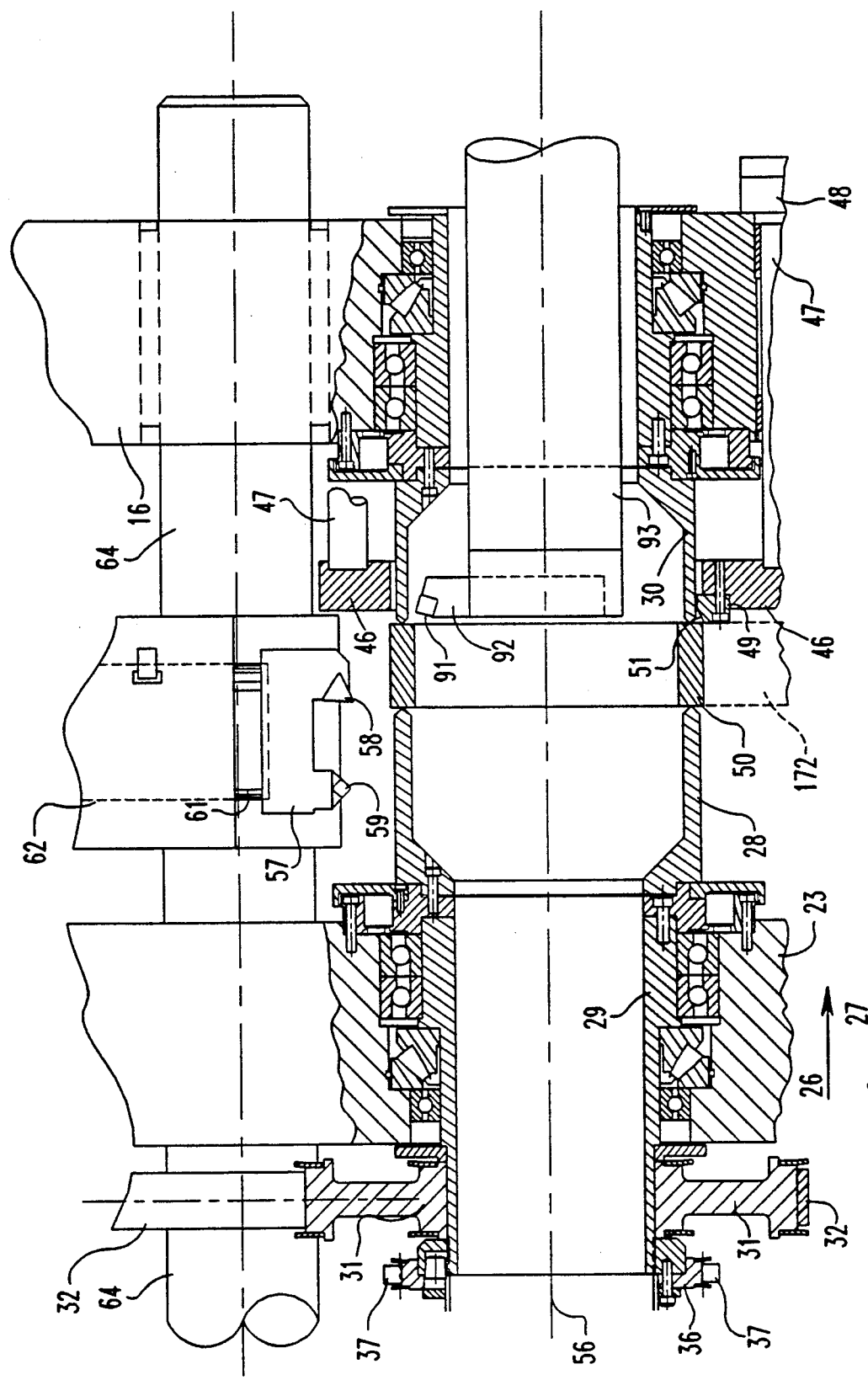
FIG. 7 is an enlarged fragmentary axial section showing the workpiece locator, gripper and driver details.
Figure 9:
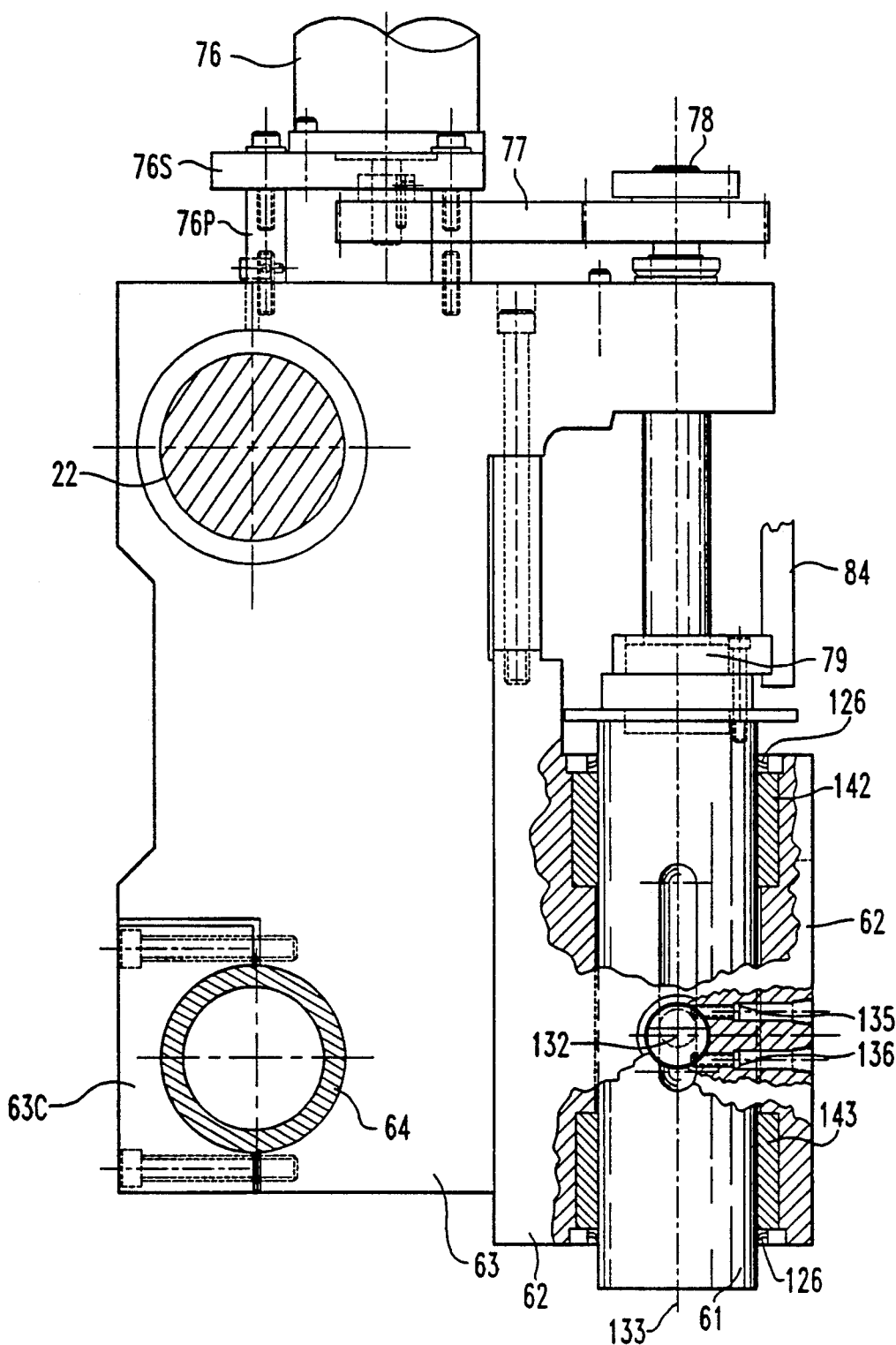
FIG. 9 is an enlarged elevational view of the $X_1$-axis turning slide assembly looking from left to right in FIG. 1 and with portions broken away to show interior details.
Figure 10:
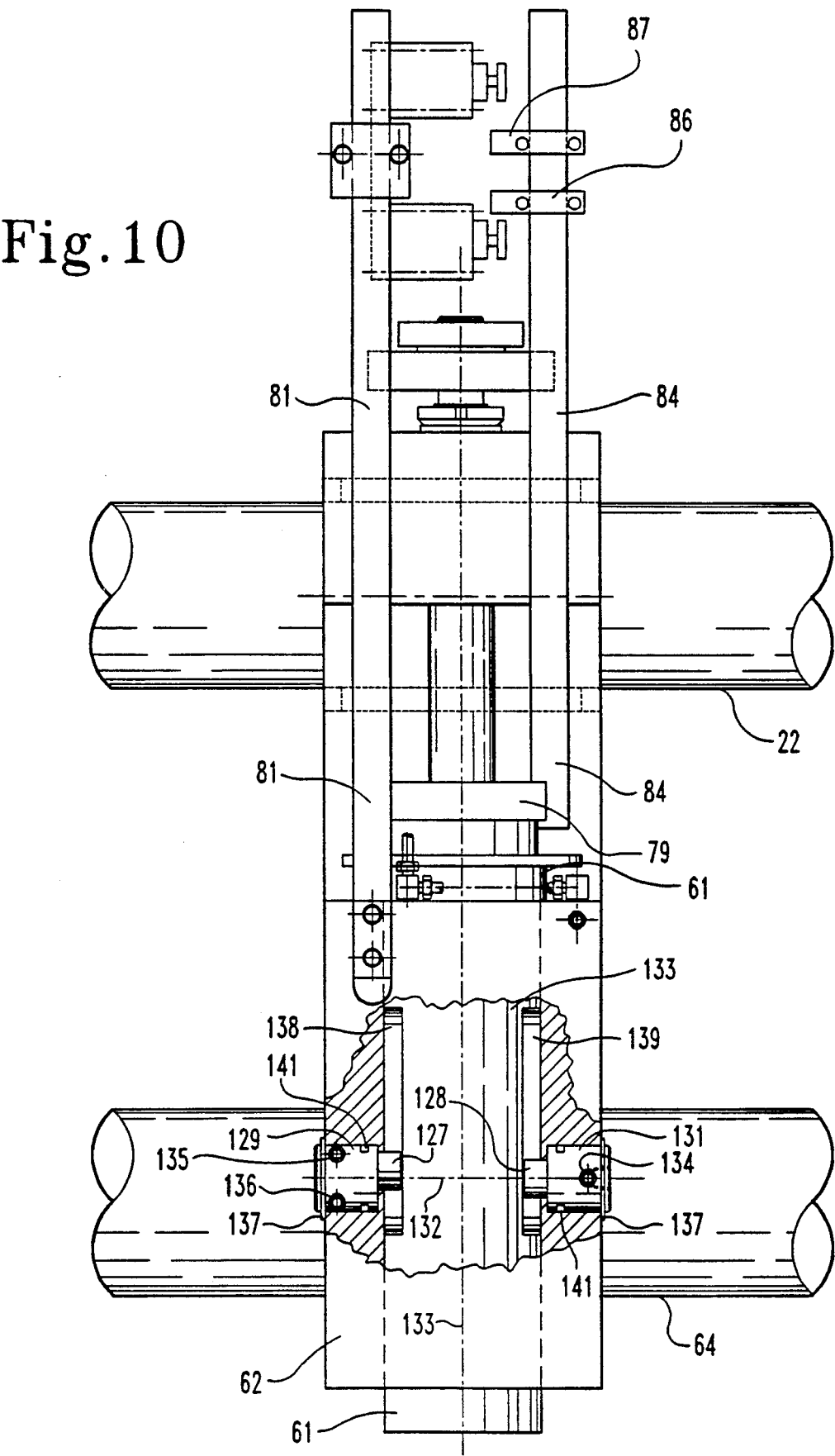
FIG. 10 is a fragmentary front elevational view thereof.

Since this is a turning and boring machine, the turning tooling will first be described. Referring to FIGS. 1, 5 and 7, a toolholder 57 holds a turning tool 58 for machining the outside cylindrical surface of the ring 50. It also holds a chamfer tool 59 for chamfering the edges at the intersection of the outer cylindrical surface and the end faces of the ring. This toolholder 57 is secured to the end of a cylindrical quill-type slide 61 (FIGS. 5, 9 and 10), which is mounted in ceramic coated bearings in the slide housing 62 which, itself, is fastened to the turning slide base 63 which is slidably mounted to the bar 22 for movement to the right and left ($Y_1$-axis) in the direction of arrows 26 and 27 (FIGS. 1 and 7). The lower end of the turning slide base 63 is clamped by cap screws through block 63C to a tube 64 which is slidably mounted in a ceramic coated bushing in the stand 14 and a ceramic coated bushing in stand 16. Tube 64 has a ball nut 66 fastened to the left-hand end of it (FIG. 1) and which receives the drive screw 67 mounted in housing 68. The drive screw has a sprocket 69 on its left-hand end and which is driven by a gear belt 71 from the $Y_1$ axis turning tool drive motor 72. The motor 72 and drive screw housing 68 are secured together by end face mounting plate 73. Housing 68 is fastened to stand 14.

The $X_1$ axis (vertical) drive for the turning tools is provided by motor 76 (FIGS. 1, 3 and 5) fastened to motor mounting plate 76S supported on and fastened to four posts 76P by four bolts as 76B (FIG. 4), the posts being fastened to the turning tool slide mount 63 by studs. Motor 76 drives a belt 77, driving a sprocket at the top of a screw 78 (FIG. 5) received in a ball nut 79 fastened to the top of the $X_1$ axis slide 61. An accessory bar 81 (FIG. 1; not shown in the other figures) fastened to slide housing 62 supports limit switches 82 and 83. Accessory bar 84 fastened to slide 61 supports limit switch operating cams ("trip dogs") 86 and 87.

Figure 6:
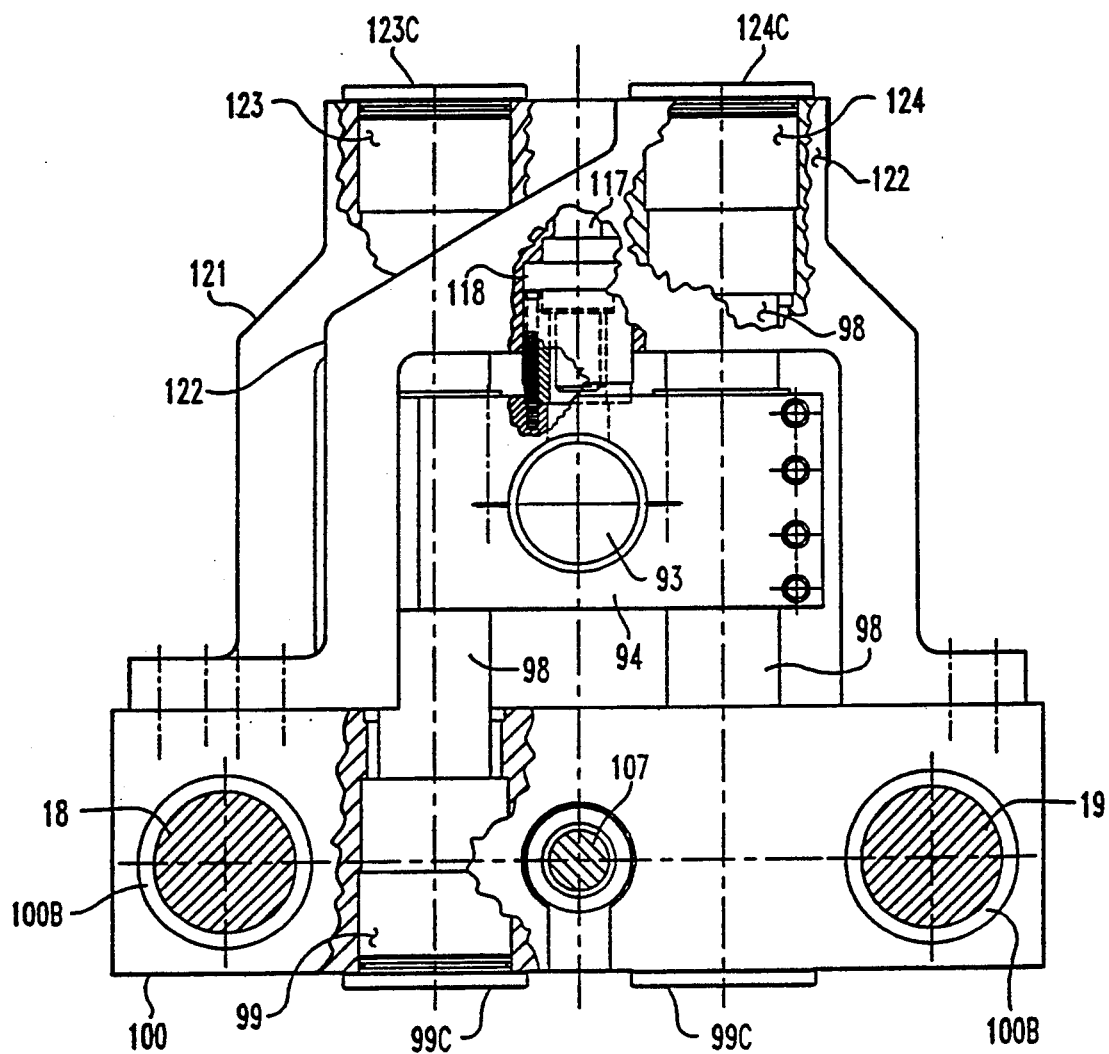
FIG. 6 is a vertical section taken at line 6—6 in FIG. 1 and viewed in the direction of the arrows and showing the boring bar vertical positioning features.

For the boring function of the machine, a boring tool 91 (FIG. 7) is fastened in a toolholder 92 fastened to the end of a boring bar 93. The boring bar is clamped in the boring bar $X_2$ axis ("cross slide") carriage 94 (FIGS. 1, 4, and 6) which is clamped to and guided on three vertical guide bars 98 each of whose lower end is slidably received in ceramic coated aluminum bushing 99 fixed in an upwardly opening bore in the $Y_2$ axis carriage 100, the bushing being secured in place against a downwardly facing shoulder in the carriage by bearing cap 99C bolted to the bottom of the carriage. There are four horizontally extending ceramic coated aluminum bushings 100B fixed in carriage 100, two of them slidably received on guide bar 18 and two slidably received on guide bar 19 whereby the boring $Y_2$ axis carriage 100 is slidably moveable in the direction of arrows 26 and 27. A boring $Y_2$ axis drive motor 102 (FIGS. 1 and 4) is secured to a motor mounting plate 102M fixed to the right-hand guideway-bar mounting stand 17. Motor 102 drives a sprocket 103 which drives gear belt 104, which drives a sprocket 106 which drives a lead screw 107 threaded into the ball nut 108 secured to carriage 100 for driving the carriage to the right and left in the direction of arrows 26 and 27, respectively.

As mentioned above, the lower ends of the three vertical guide bars 98 are slidably received in bearings 99 fixed in the $Y_2$ axis carriage 100. For guiding support of the upper ends of these guide bars, two bridges 121 and 122 are provided. The left-hand (FIGS. 1 and 4) bridge has two bearings 123 (FIG. 6) in it mounted exactly like the bearings for the lower ends of guide bars in the $Y_2$ axis carriage and fixed in place against upwardly facing shoulders in bridge 121 by bearing caps 123C bolted to the top of the bridge. Similarly, the right-hand bridge has a bearing 124 fixed in it by bearing cap 124C bolted to the top of the right hand bridge 122. The bushing 124 receives the upper end of the right-hand vertical guide bar 98. All three of these upper end bushings are fixed in their respective pockets by caps fastened to the tops of the respective bridges 121 and 122 by socket head cap screws. The upper and lower vertical guide bar bushings enable a limited amount of vertical travel of the bars 98 therein.

Figure 4:
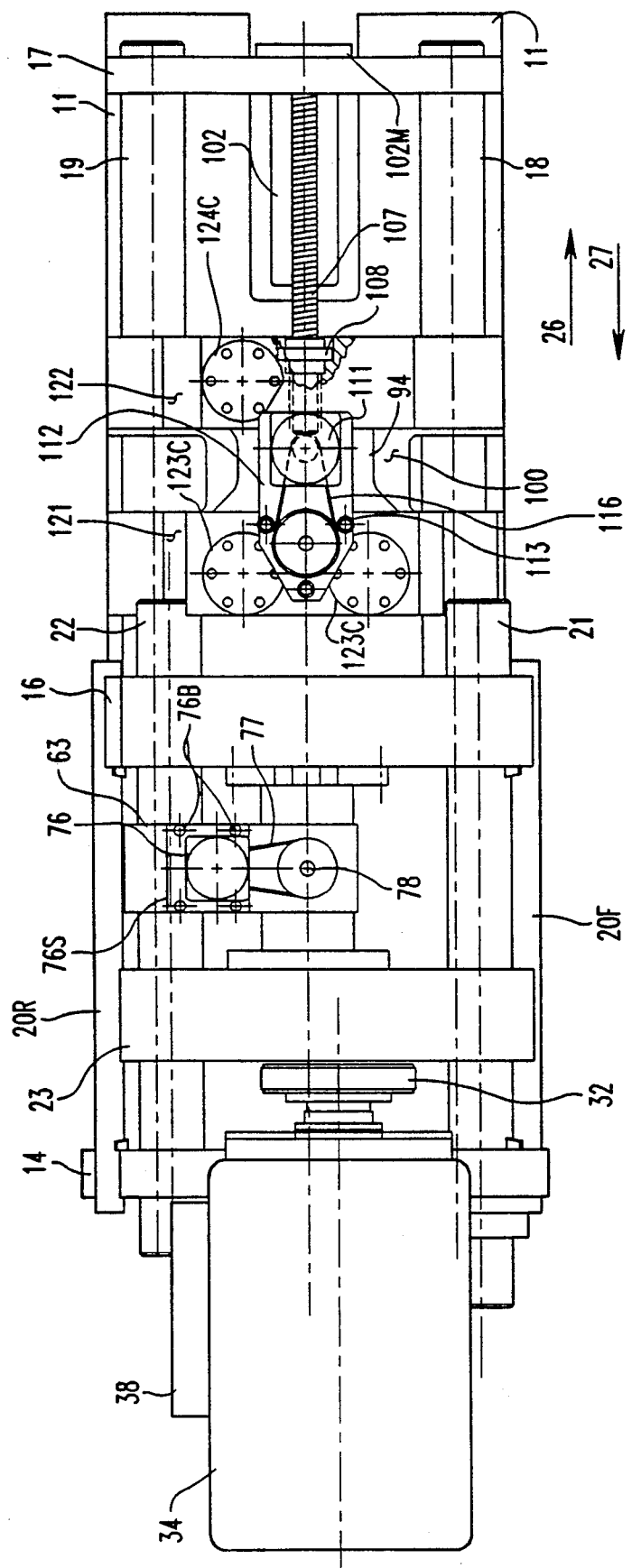
FIG. 4 is a top plan view thereof.

Vertical drive for the $X_2$ axis carriage 94 is provided by motor 111 mounted to the plate 112 which is fastened by three bolts 113 in FIG. 4 through spacers to the top of the $Y_2$ axis carriage bridge 121. The output shaft of motor 111 drives a sprocket driving gear belt 116 driving a sprocket at the upper end of the $X_2$ drive screw 117 which is a ball screw received in a ball nut 118 which is fixed to the $X_2$ axis carriage 94. As mentioned above, this carriage is slidably guided by the three vertical guide bars 98 in bushings 99 at the bottom and 123 and 124 at the top as the boring bar slide is driven up and down by the motor 111 driving the ball screw.

Figure 8:
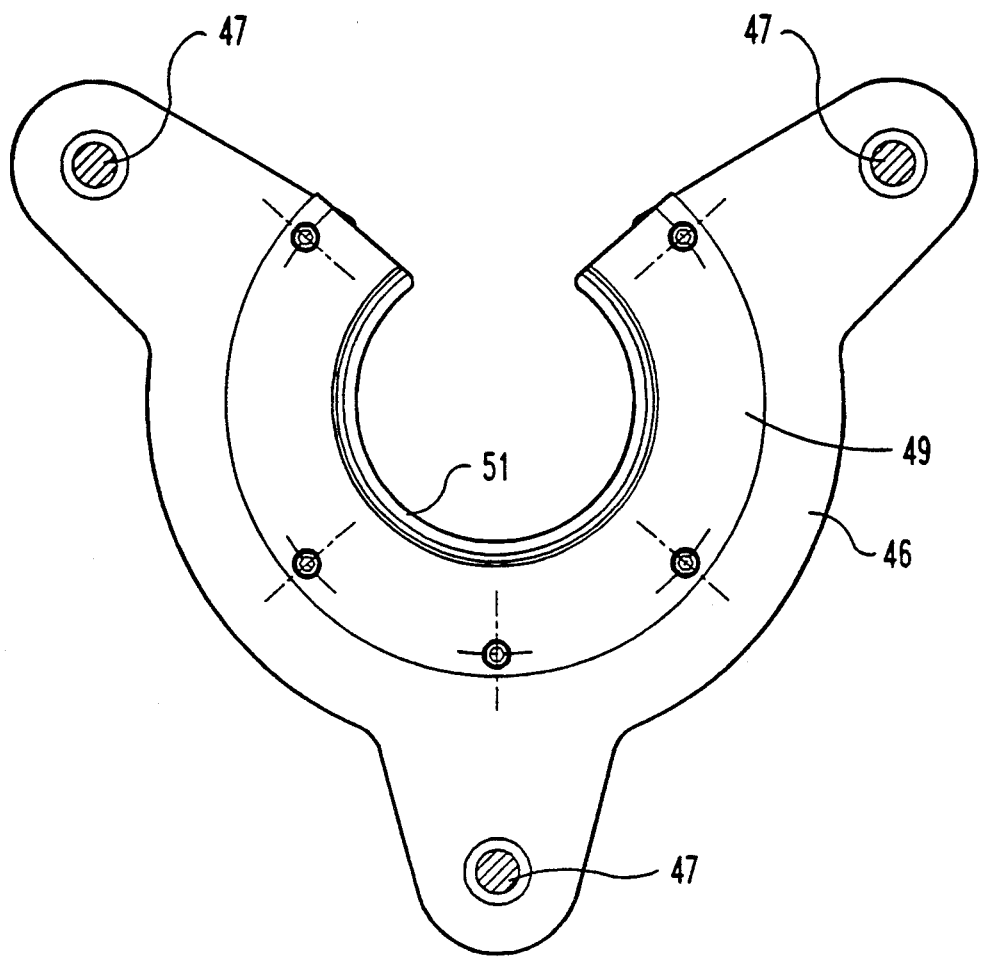
FIG. 8 is a further enlarged axial view of the workpiece positioner.

Referring now to FIG. 8, the part positioner 49 is shown secured to the positioner mounting plate 46. Both the part positioner mounting plate and the part positioner itself, are upwardly-opening crescent shaped and situated so as to be able to engage the chamfered conical left-hand edge 51 (FIG. 7) of the positioner with the circular lower right-hand edge of the workpiece ring after the ring is placed in the work station by the loader. Then, as will be described below, the positioner/plate assembly can be moved to the left by the hydraulic actuators 48 to engage the workpiece ring by the chamfered surface 51 on the positioner. The camming action of the conical surface 51 serves to center the workpiece ring on the turning axis 56 as the positioner lightly clamps the workpiece ring against the spindle clamp cylinder 28 of the driving spindle assembly. Then the hydraulic actuators 24 drive the clamp plate 23 to the right and thereby drive the workpiece ring to the right against the driven spindle cylinder 30 of the driven spindle assembly which is mounted in the stand 16 in essentially the same way as the driving spindle assembly is mounted in the clamp plate 23. Then the hydraulic actuators 48 for the positioner mounting plate are retracted so the positioner is pulled out of the way to enable the turning tools to function on the workpiece.

From the foregoing description, it is evident that the various carriages or slides are somewhat remote from the work station, except for the external turning tool holding slide 61. The cylindrical cross section of the turning tool slide 61 facilitates employment of round lip seals 126 (FIG. 9) for good reliable sealing and cleaning of the slide as it moves the cutters 58 and 59 toward and away from the work. Rotation of the slide in the slide housing is avoided by a keying system comprising cam rollers mounted in the housing and received in keyways in the slide.

The system includes rollers 127 and 128 mounted on cylindrical holders 129 and 131, respectively. These holders fit in cylindrical sockets in the slide housing 62 and have a common axis 132 perpendicular to the slide bore axis 133. Roller 128 is centered on the axis of holder 131, but the axis of roller 127 is offset from the center of holder 129. Both holders can be turned in their sockets, if desired, but are normally secured by one setscrew 134 in housing 62 for holder 131, and two setscrews 135 and 136 for holder 129.

The depth of the holder in the socket is limited in each case by a snap ring 137 received in a groove in the holder and abutting the wall of the housing 62.

The rollers 127 and 128 are fittingly received in diametrically opposed longitudinally extending keyways 138 and 139, respectively, in the slide 61. Since the roller 127 is eccentrically mounted in the holder 129, and the setscrews 135 and 136 are dog point setscrews whose points are received in notched seats in holder 129, these setscrews can be used to turn the holder 129 about its axis 132 in its socket to move roller 127 out of a plane containing the holder axis 132 and slide bore axis 133, i.e. to the left or right in FIG. 9. This feature is useful to transversely load the slide 61 against the upper and lower ceramic bushings 142 and 143, respectively, if needed to compensate for clearance due to wear, for example. The loading is in a plane perpendicular to the workpiece rotating spindle axis 56 and is thereby well suited to apply bearing loads if and as needed to handle cutting loads on the turning tools. "O-ring" seals 141, each seated in a groove in the respective rollerholder, prevent the lubricant for ceramic bushings 142 and 143 from leaking out of the housing 62 around the roller holders 129 and 131.

Figure 11:
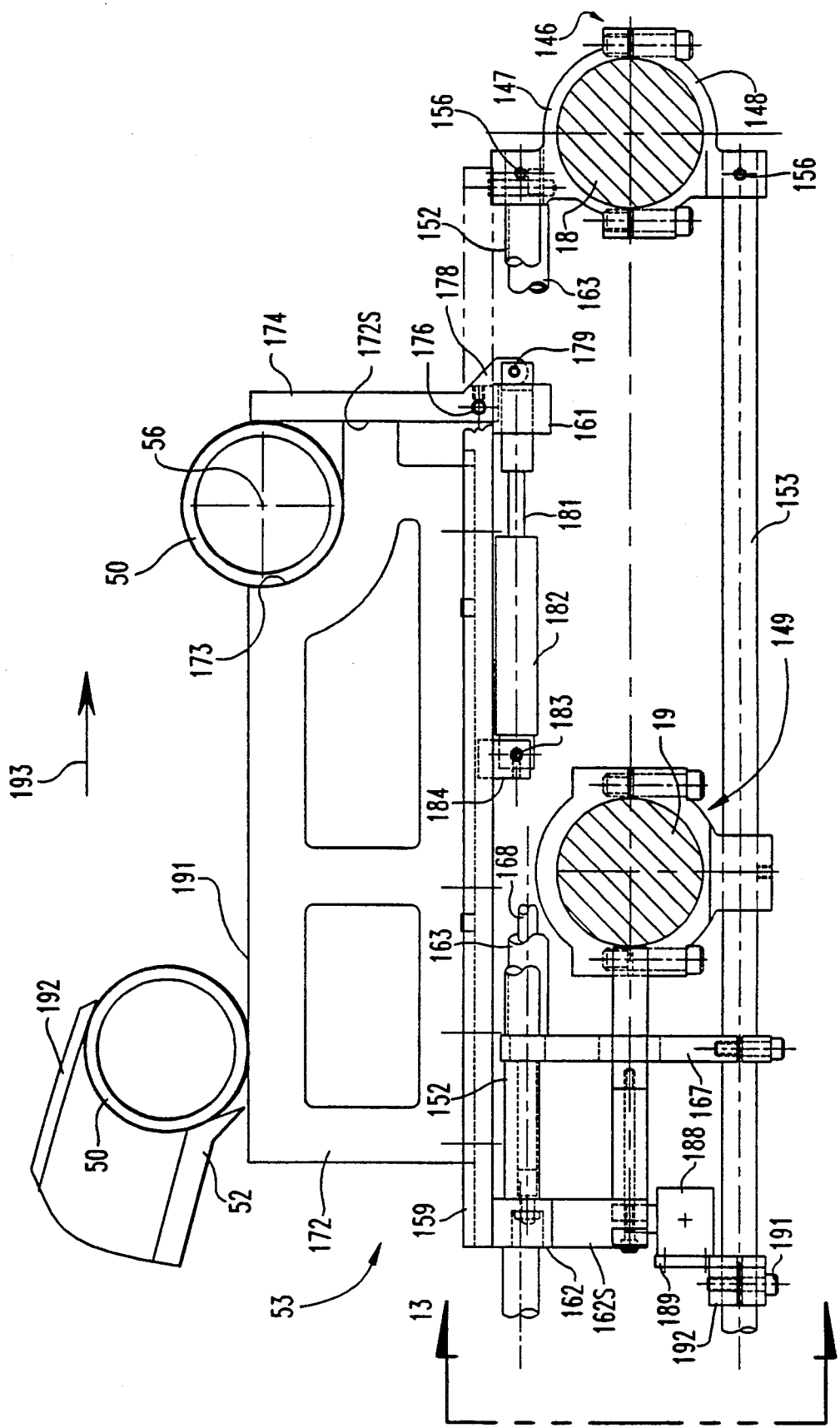
FIG. 11 is an enlarged elevational view showing most of the workpiece loader assembly as viewed in the direction from left to right in FIG. 1 at a vertical plane immediately to the left of the workpiece 50.
Figure 12:
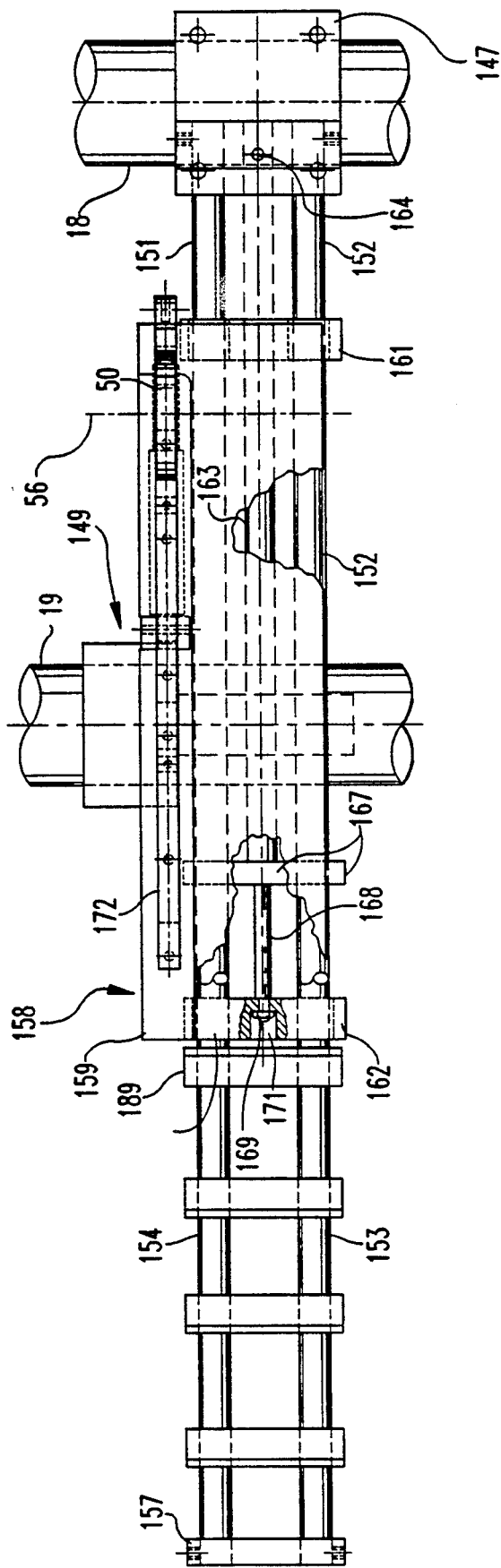
FIG. 12 is a top plan view of the loader assembly on a slightly smaller scale than FIG. 11.
Figure 13:
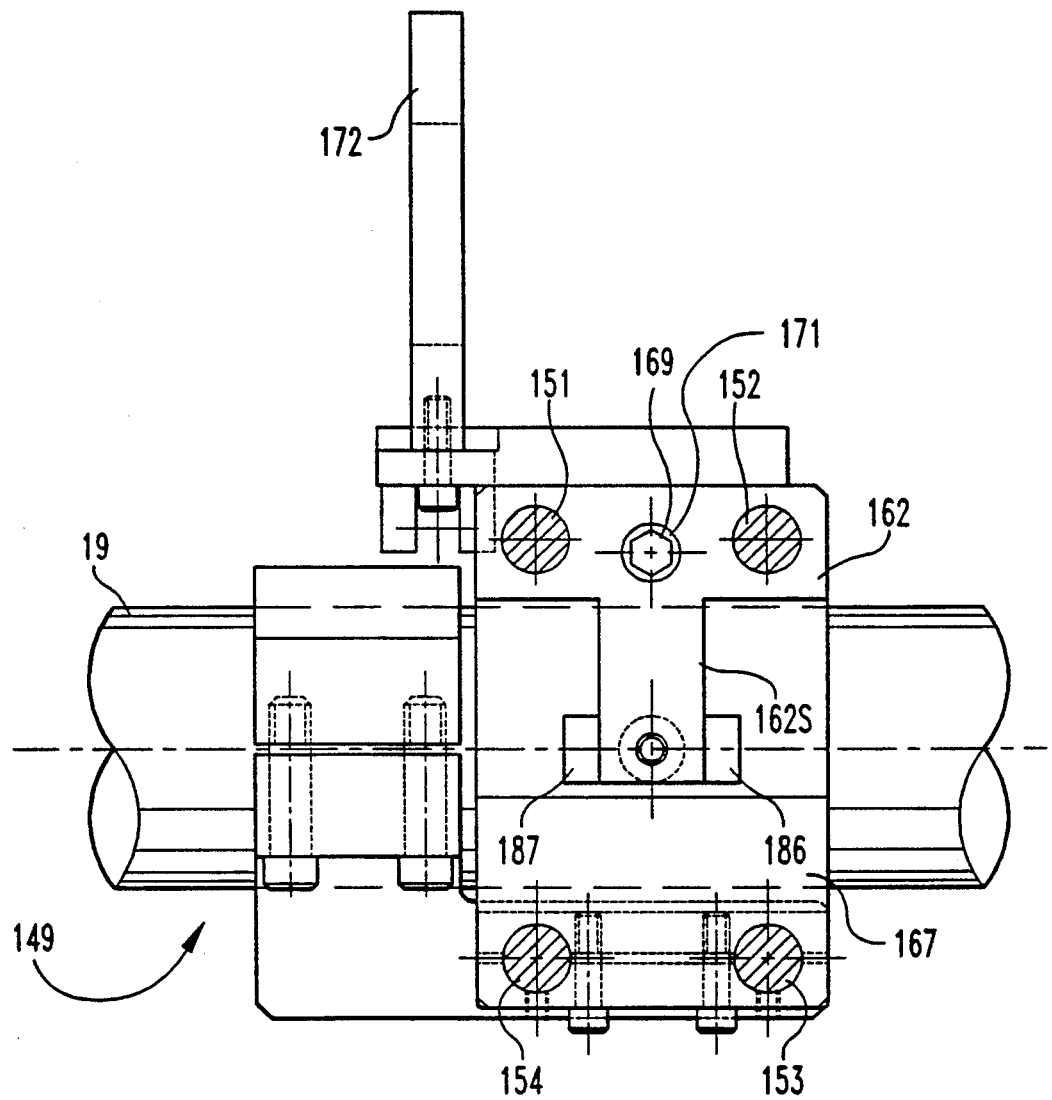
FIG. 13 is a sectional view thereof at line 13—13 in FIG. 11 but on a much larger scale.

Referring to FIGS. 11-13, the loader assembly 53 has a support structure including the front shaft support 146. This support includes the upper shell 147 and lower shell 148 which are clamped together around the machine frame bar 18. Similarly, an intermediate support 149 comprises upper and lower shells which are clamped to the machine rear frame bar 19. The front support 146 has two apertures in the upstanding boss atop upper shell 147 and two in the downwardly projecting boss at the bottom of lower shell 148, each aperture receiving and locating the front end of a different one of four parallel shafts 151, 152, 153 and 154. Each of these shafts is secured in the respective support aperture by a setscrew such as 156. Similarly, the lower two shafts 153 and 154 are secured to the downwardly projecting boss of the lower shell of the intermediate support 149 by setscrews. A shaft rear end tie plate 157 has four apertures therein receiving the rear ends of each of the four shafts which are secured to it by setscrews.

A loader shuttle includes slide 158 having a table plate 159 with front and rear mounting bars 161 and 162 fastened to it. Each of these bars has two bushings in it, one received on shaft 151 and the other received on shaft 152, whereby the table can slide freely toward and away from the machine spindle axis 56. A loader slide drive hydraulic cylinder 163 has its front end received and secured by a dowel pin 164 (FIG. 12) in the upstanding boss of the top shell 147 of the front support, and spaced equidistant between the shafts 151 and 152. The rear end 166 of the cylinder 163 is supported in the slide cylinder support 167 which is clamped to the lower two shafts 153 and 154. The rear end of the piston rod 168 is secured to the bar 162 by a nut 169 threaded on the end of the piston rod received in the rearwardly opening pocket 171 of bar 162.

A workpiece support wall 172 is fastened to the top of the table 159. It is shown advanced to its forward stop where it is holding a workpiece 50 in the arcuate cradle portion 173, centering the workpiece about the center line 56 of the spindle. A workpiece stop bar 174 is pivotally mounted on a pivot pin 176 secured in the bar by a setscrew and pivotally mounted in a forwardly opening yoke in the table. The lower portion of the stop bar projects forward and down at 178, providing a yoke which is pinned by the pin 179 to the piston rod 181 of the stop bar operating hydraulic cylinder 182 whose rear end is pinned by pin 183 secured by setscrew to the cylinder rear end mounting tab. The dowel pin 183 is received and pivotally mounted in a downwardly projecting yoke 184 secured to the bottom of the table. This cylinder 182 is hydraulically operable to drive the stop bar 174 from the workpiece stop position shown in FIG. 11 to a horizontal position 90° clockwise from the position shown, upon retraction of the piston rod 181 of the cylinder 182. Since it is a double acting cylinder, extension of the piston rod will return the bar 174 to position against the stop 172S at the front end of the workpiece support wall to confine a workpiece in the cradle portion 173 thereof.

The bar 162 at the rear end of the table is T-shaped with the stem 162S (FIG. 13) of the "T" projecting downward. It may have tabs such as 186 and 187 projecting laterally from it for operation of one or more limit switches such as 188 for operation by tab 187. The switch 188 is mounted to a bracket 189 secured to the rails of the bottom shaft 153 and 154 by clamp screws 191 through the rearwardly projecting boss on the limit switch mounting plate 189 and threaded into the top clamp 192. This limit switch is not shown in FIGS. 12 or 13, to avoid complicating the drawing. However, as many of these limit switches as may be needed can be mounted to the lower shafts 153 and 154 on the bracket 189 and three additional brackets spaced where desired between bracket 189 and the rear end tie plate 157 for actuation by tab 186 or 187 to respond to various achieved positions of the table.

Referring now to FIGS. 14–17, the gage assembly 195 includes a body 196 having a front (relative to the turning machine) end 196F, a rear end 196R, a lower end 196L, and a top 196T. The body is shaped to provide two intersecting channels. One of them is channel 197 extending from left to right in FIG. 14 parallel to axis 198. The other is channel 199 extending from the body top 196T to the bottom 196L along the axis 201. The open face of channel 199 is covered by the O.D. probe cover plate 200 which is fastened to the gage body 196 by one or more screws but most of it is broken away in FIG. 14 to show the O.D. probe 206 itself.

Figure 14:
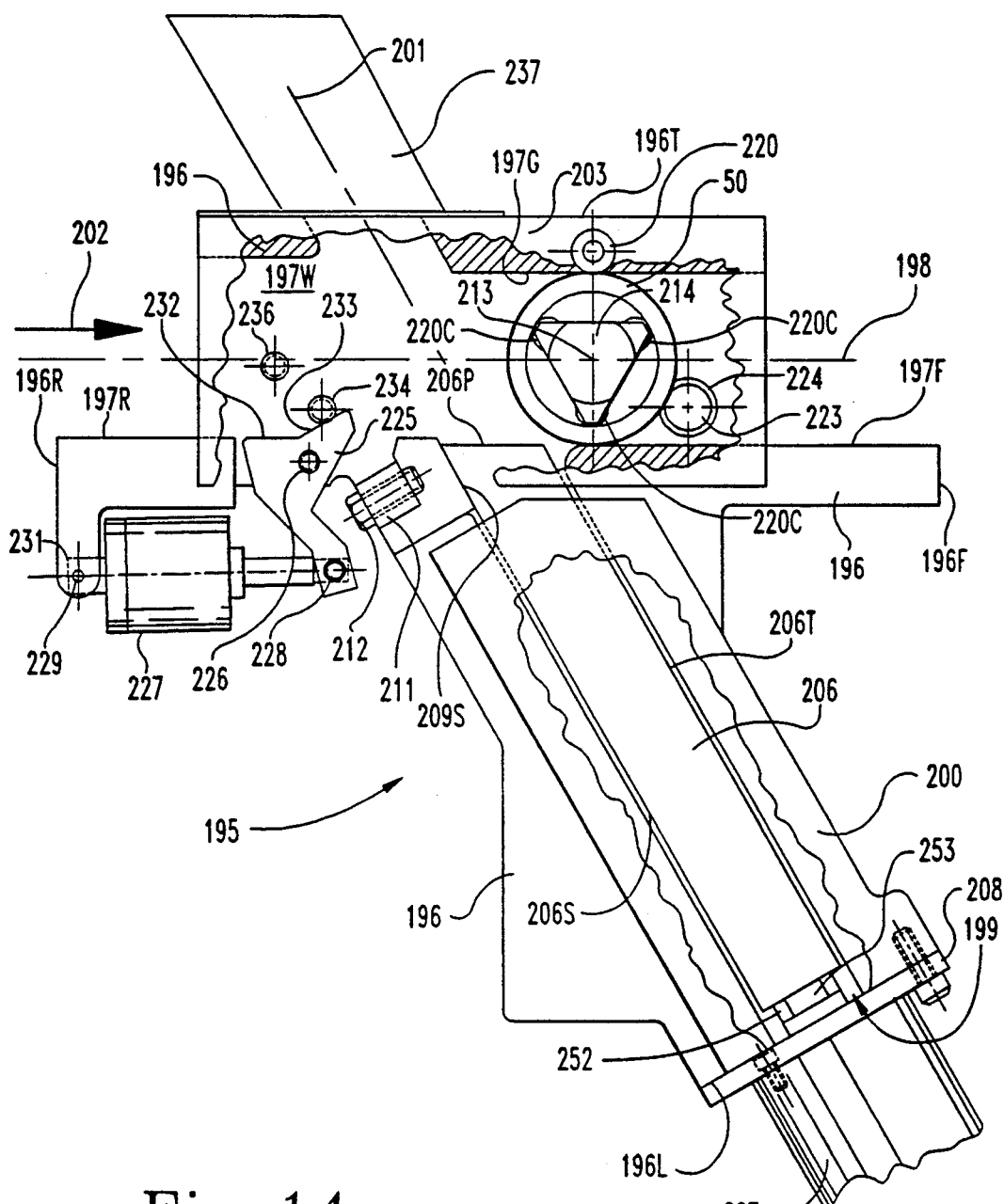
FIG. 14 is an enlarged elevational view of the gage assembly looking from left to right in FIG. 1, but not showing it in the installed attitude which, as viewed from right to left in FIG. 1, can be noted in the broken line representation at the left in FIG. 5.
Figure 15:
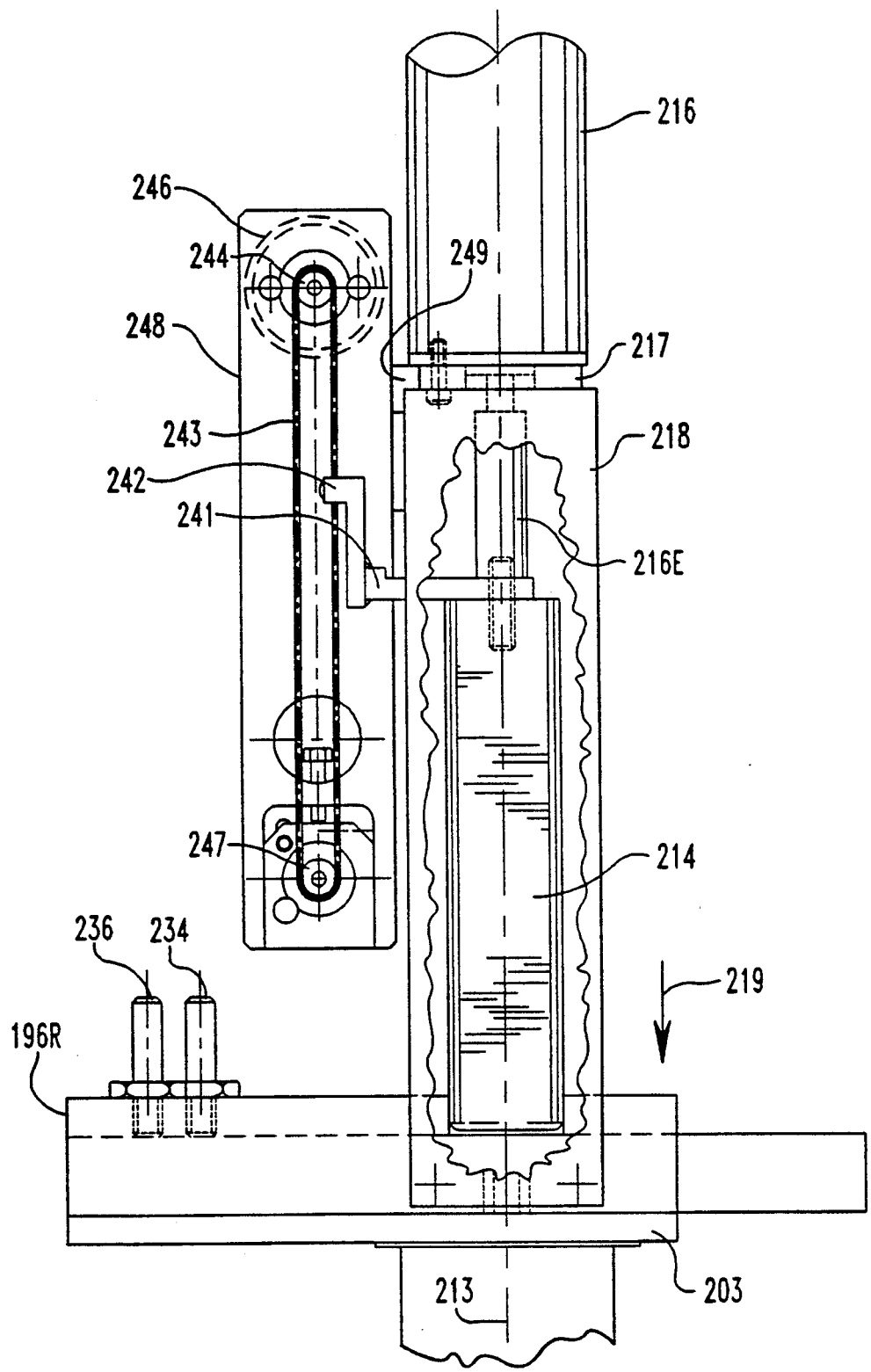
FIG. 15 is a top plan view of the gage as shown in FIG. 14 but with a portion broken away to show some interior detail.
Figure 16:
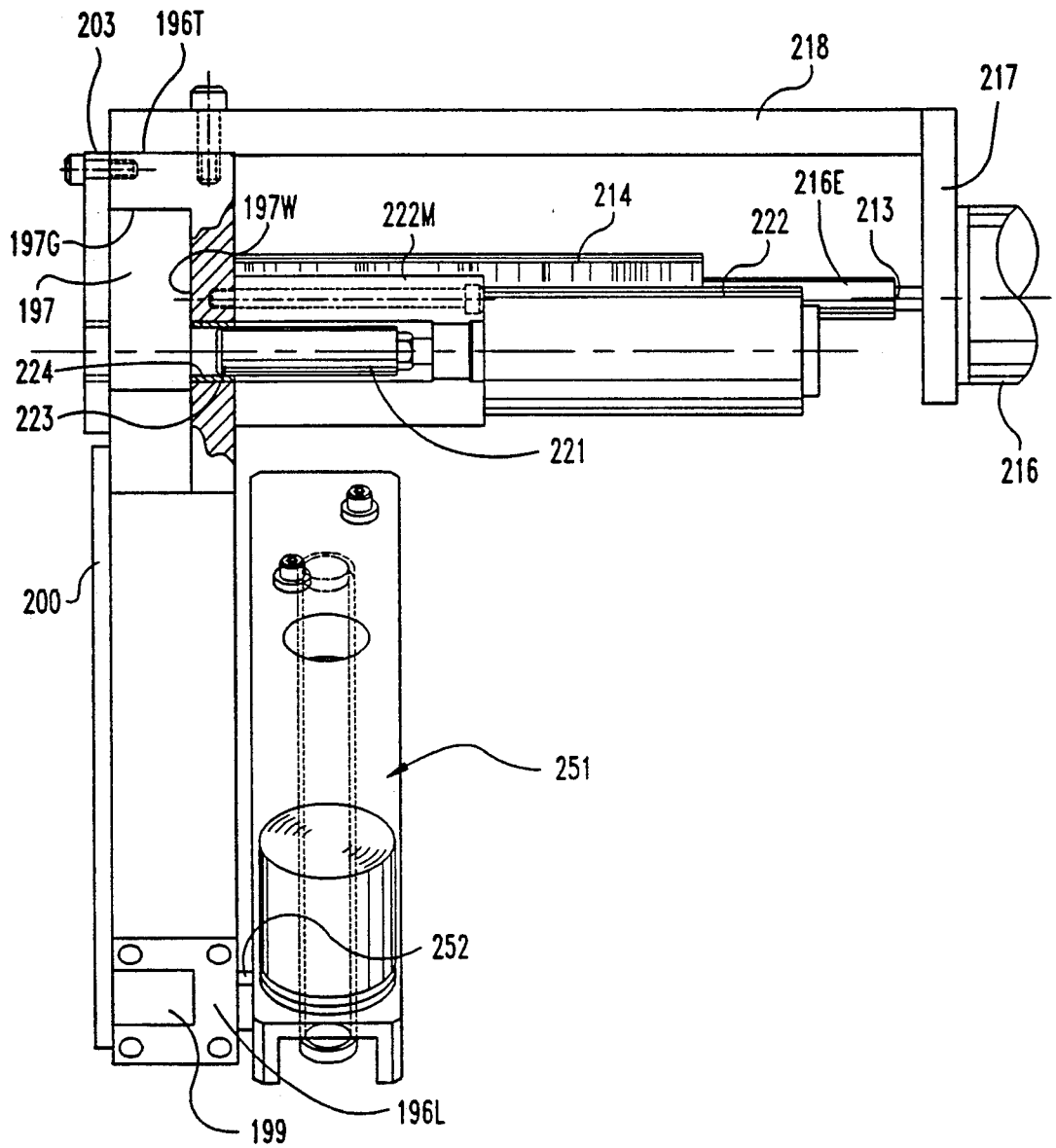
FIG. 16 is a fragmentary view of the gage assembly as it would look when viewed from the right in FIG. 14 and as it would look in FIG. 1. if shown there, but much enlarged in FIG. 16 and omitting one of the probe drive cylinders.
Figure 17:
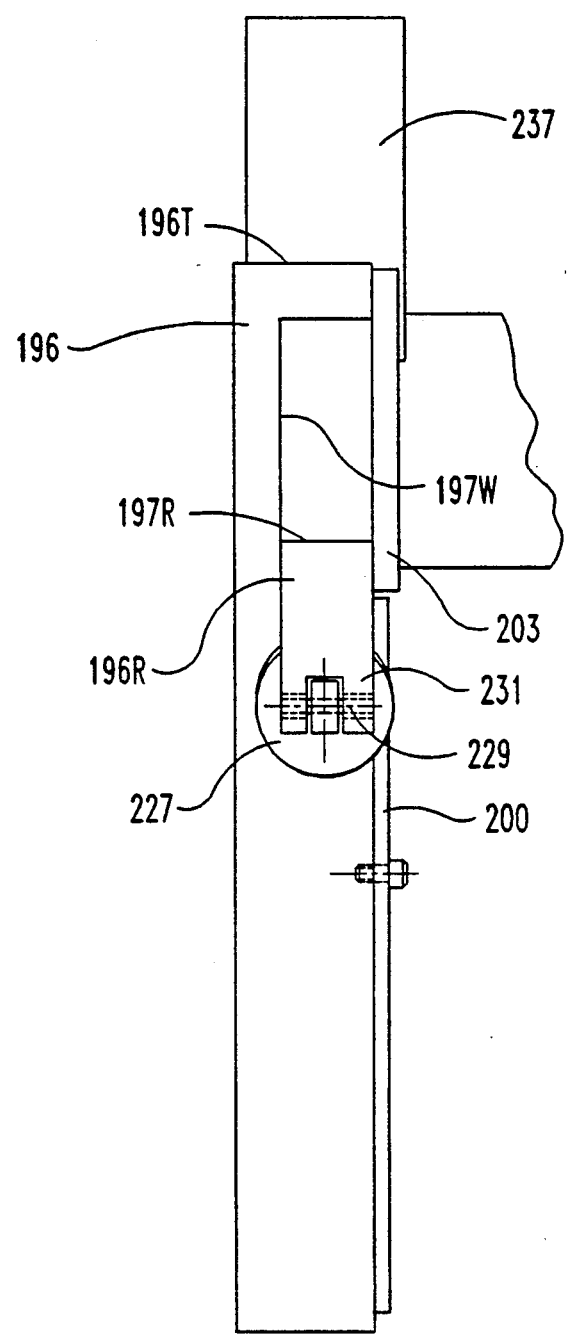
FIG. 17 is a fragmentary view of a portion of the gage assembly as seen from the left in FIG. 14.

At this point it should be mentioned again that, while the axis 198 is shown horizontal and axis 201 is shown at an incline in FIG. 14, and the related FIGS. 15–17 are projections from FIG. 14, this is to facilitate the illustration. However, in use, the axis 201 is essentially vertical and axis 198 is downwardly inclined from the rear 196R to the front 196F so as to receive and move by gravity, the machined rings as they leave the spindle 56. They leave the front of the workstation and enter the rear end of channel 197 in the direction of arrow 202 and, after gaging, depart from channel 197 at the exit end and off the front edge 196F of the gage body onto a conveyor or other collector (not shown).

Channel 197 includes a support surface 197R which begins at the rear end 196R of the body portion and extends into the entrance of the channel. Channel 197 also includes a ring support surface 197F extending out the front end of the channel to the front end of the body 196F. The channel includes an upper guide surface 197G (FIGS. 14 and 16) which extends from the cross channel 199 to the front end of the channel in the body. The inside wall 197W of the channel provides a guide for one side of the ring. A gage side cover plate 203 bolted to the body closes the channel, providing the other side guide surface for the ring, thus completing a passageway for the ring to be advanced from the entrance to the exit of the gage assembly.

An outside diameter (O.D.) gage probe 206 is slidably received in the channel 199. In FIG. 14 it is shown retracted by the pneumatic cylinder 207 having a mounting flange 208 at its upper end fastened to the bottom of the gage body at 196L. The probe is connected to the piston rod and, when retracted, the upper end of 206P of the probe, being flat and on an angle with respect to the axis 201, is coplanar with the ring support surfaces 197R and 197F in the gage body. The lower surface 206S of the probe is straight and flat and parallel to the axis of cylinder 207 which is at least theoretically colinear with the axis of the channel 199. The top surface 206T of the probe has a mild taper of 0.001 inch per inch of length. There is sufficient clearance between the walls of channel 199 and all faces of the probe to avoid binding, regardless of whether the probe is fully retracted or fully extended by its drive cylinder 207. Support for the surface 206S of the probe is provided by an adjustable wear pad 209 which is secured on the gage body boss 211 by cap screw 212 and provides a flat surface 209S in a plane that is perpendicular to a radius from a center 213 which is the axis of an internal diameter (I.D.) gage plug 214.

In FIG. 15, the I.D. probe plug, 214 is shown in its retracted position held there by pneumatic cylinder 216, whose rod end is mounted by screws to a downwardly projecting plate 217 at the end of a bracket arm 218 which is fastened by screws to the top 196T of the gage body. The inner end of the I.D. plug 214 is fastened to an extension 216E on the piston rod of the cylinder 216. As shown in FIG. 14, the I.D. probe plug 214 is generally triangular in cross-sectional configuration but with the points of the triangle rounded off with a radius slightly small than the radius of the smallest ring whose internal size is to be measured by the plug. In a manner similar to the O.D. probe, the taper of the I.D. gage plug is 0.001 inch per inch of length overall. Since the I.D. gage plug has the three corner configuration, it is suitable for measuring a somewhat average internal diameter of the ring, rather than simply the dimension across opposite points on a single diameter which would afford no recognition of out of roundness of the bore of the ring. The gage body wall 197W has a generally triangular aperture to slidably receive and support the distal end of the plug 214 but with the corners 220C of the aperture amply rounded to provide clearance to avoid any binding or interference with proper operation of the plug as it is driven in the direction of arrow 219 (FIG. 15) by the I.D. probe cylinder 216.

A shot pin 221 has a proximal end fastened to the piston rod of the shot pin drive cylinder 222 fastened to a cylinder mount 222M fastened to the outside of the gage body. The shot pin is shown in its retracted position where the distal end portion 223 is slidably and guidingly received in a bushing 224 (FIG. 14) secured in the wall 197W of the gage body. A similar bushed aperture (not shown) is provided in the gage side guard 203 to receive the distal end of the shot pin when it is advanced by the pneumatic cylinder 222 to provide a locating stop for a machined ring moving from the gage entrance toward the gage exit.

As indicated above, a machined ring enters the gage by gravity. To prevent uncontrolled passage through the gage, a loader lever 225 is provided. It is pivotally mounted to the gage body at dowel pin 226 and is shown in its normal rest position where it has been advanced by the loader air cylinder 227 whose piston rod is pinned at 228 to the downwardly projecting arm of the lever 225. The opposite end of cylinder 227 is pinned at 229 to a yoke 231 at the rear end of the gage body.

The loader is shaped so that when it is in the at rest position, it provides a flat surface 232 on which the ring can roll. But there is a ramp 233 at the end of the flat surface to prevent the ring from rolling forward while the loader is in the position shown.

Referring to FIGS. 14 and 15, there are two proximity switches 234 and 236 mounted on the gage body 196 and projecting to the wall surface 197W. These sense the position of the loader surfaces 232 and 233.

At the top of the gage body 196T, there is an O.D. probe guard housing 237. The Purpose is to receive the upper end of the O.D. probe 206 when it is extended by the probe drive cylinder 207 while gaging a machined ring 50, and avoid interference with or injury to anyone standing adjacent the machine.

Referring further to FIG. 15, there is shown an example of a rotary encoder arrangement for the I.D. gage probe. In this example, an arm 241 is fastened to the piston rod extension 216E. The outer end of the arm is connected at 242 to a point on an endless belt 243 which operates between a pulley 244 on a rotary encoder 246, and an idler pulley 247. The rotary encoder and the idler pulley are mounted on a bar 248 welded on an adaptor bracket 249 which is secured to the I.D. probe cylinder mounting bracket 218. Consequently, as the I.D. probe cylinder drives the probe in or out, the distance traveled is directly reflected by turns of the rotary encoder. Similarly, a rotary encoder assembly 251 is mounted to the gage body adjacent the O.D. probe and operated by an arm 252 connected to the piston rod-probe junction 253 (FIG. 14) for the O.D. gage probe.

OPERATION

In the operation of the machine, the external tool holding slide 61 is retracted radially away from the turning axis 56. It will also be retracted toward the left stop (FIG. 1). The boring bar will be retracted in the direction of arrow 26 so that the cutter 91 is inside the generally cone shaped cavity in the left-hand end of the stop cylinder 30. The positioner 49 is also retracted to the right, and the clamp cylinder 28 is retracted toward the left.

A workpiece ring 50 from the group resting on ramp 52 will have already moved down into position on top 191 of the support wall 172 of the loader 53. It will be retained there between the ramp 52 and the top guide 192 of the supply chute outlet until the loader traverse cylinder 163 has driven the loader table to its rearwardmost position whereupon the cradle 173 will be directly under the discharge end of the supply chute 52. Then a ring may drop into the cradle. It will be stopped by the stop bar 174. Then the loader moves forward toward the spindle axis 56 to a stop and standby position far enough away from the spindle axis to avoid interference with any of the machine parts while the turning and boring of the previous ring is being completed. When that machining has been completed, the turning and boring tooling is withdrawn, the spindle is stopped, the clamp cylinder 28 is retracted to the left and the completely machined workpiece ring rolls out into the gage entrance. Immediately, the loader traverse cylinder 163 drives the table forward (to the right in the direction of arrow 193 in FIG. 11; to the left in FIG. 5) to locate the workpiece ring into position where it is approximately centered on the turning axis 56. Then the positioner is advanced to the left (FIGS. 1 and 7) by actuators 48 to engage the right-hand edge of the workpiece ring and move it toward the clamp cylinder 28. As the workpiece is moved to the left, the chamfered edge 51 of the positioner centers the workpiece on the turning axis 56. As soon as the workpiece, being driven to the left by the positioner, touches the clamp cylinder 28, the stop bar control cylinder 182 on the loader is actuated to retract the piston rod whereupon the stop bar 174 is pivoted down to the horizontal position to enable retraction of the table 159 from the workpiece and return to the back stop where it receives the next workpiece ring 50 in the cradle 173. It then moves forward to the standby position previously mentioned.

When the workpiece becomes clamped between the positioner and the clamp cylinder 28, the clamp cylinder is then actuated by the hydraulic actuators 24 on the clamp plate to drive it to the right against the force still exerted by the actuators 48 on the positioner. This action is continued until the workpiece ring engages the left-hand edge of the stop cylinder 30. When the workpiece ring is thus thoroughly clamped between the clamp cylinder 28 and the stop cylinder 30, the hydraulic pressure is reversed in actuators 48 whereby the positioner is retracted to the right (arrow 26 direction) so it is out of the way of the external turning tools. Then the boring bar which has been moved so as to provide clearance between the cutter 91 and the inside of the workpiece ring, as well as between the bar itself and the inside of the ring, is advanced to the left so that, when the clamping cylinder 28 begins to be rotated by the drive motor, both the cutter 91 on the inside and the cutter 58 on the outside will be positioned to work on the workpiece simultaneously on a radial line from the turning axis 56 so the loads, both externally and internally due to the external turning and internal turning, will be essentially balanced. Then the $X_1$ and $X_2$ drives are moved to the extent needed for the depth of cut to be made to place the cutters in contact with the surface to be cut. Then the Y-axis drives are started for the turning operation. When the cut has been made from left to right by both the external tool and the boring bar, a chamfer is placed on the left-hand edge of the ring by the chamfer tool 59. Similarly, a chamfer can be made on the right-hand edge of the ring by the other side of the cutter 59. Then the tools can be returned to original position or at least positioned out of the way so that, when the clamp cylinder is released, the workpiece ring move out to the gage entrance, and another ring can be placed in the work station by the loader.

In the machining operations, the feeds and speeds and the sequencing of the steps can be achieved in a conventional way, all under the control of a computing controller which is not a part of this invention. A completed ring enters the gage assembly where it is checked by simultaneously measuring the inside diameter with the pyramidal I.D. gage plug, and the outside diameter with the combination locator cylinder, shot pin stop and O.D. probe wedge. The wedge and plug are operated by linear actuators which simultaneously drive associated rotary encoders for delivering gaging signals to the computer for control of the slide drive screws for automatic adjustment if and as needed when any adjustment is dictated according to accepted statistical process control analysis procedures after computer analysis of a pattern of deviations.

More specifically, both the I.D. plug 214 and O.D. wedge bar 206 are retracted from the workpiece passageway in the gage body. The gage loader lever 225 is in the position shown in FIG. 14 which will prevent travel of the workpiece until the cylinder 227 is actuated to retract its piston rod. The shot pin drive cylinder 222 is energized to drive the shot pin across the passageway. Then the loader cylinder 227 is activated to retract its piston rod and as surface 232 moves up and surface 233 moves down, the workpiece ring will move forward and downward and locate itself against the locator post 220. Then the cylinder 227 again returns the lever 225 to its normal position to stop and hold the next ring. Meanwhile, the I.D. probe cylinder and O.D. probe cylinder drive their respective probes into position where the top surface 206T of the O.D. probe bar snugly engages the outside diameter of the ring 50. Similarly, the rounded corners of the pyramidal plug 214 snugly engage the I.D. of the ring 50. The amount of travel of each of the probes is directly transmitted to the rotary encoders. Since the I.D. plug and the O.D. bar have the tapers as previously mentioned, the greater the travel of the I.D. plug, the larger the diameter of the bore of the ring. Similarly, the greater extended travel of the O.D. bar, the smaller the outside diameter of the ring. Use of this information from the I.D. plug can be directly related to the internal diameter of the ring and, since it is the use of three points of contact inside the ring, rather than simply across the center of the ring, a reasonable and automatic compensation for any possible out of roundness of the bore is automatically taken into account. Similarly, for the outside diameter of the ring, it should be noted that the distance of the outer cylindrical surface of the shot pin and of the locator post and the median distance of the wedge surface 206T, from the center 213 are the same and, in fact, that center is defined by these surfaces. Therefore, the measurement of the outside diameter of the ring is also automatically accounting for any out-of-roundness of that surface. As previously mentioned, it is ideal if the center 213 is on the center line of the I.D. probe. However, since the location of the ring against the shot pin and the locator post is first established by the closure of the wedge against the ring, there is sufficient flexibility in the coupling of the I.D. probe 214 to the shaft of the associated drive cylinder 216 that the probe would be self-centering in the bore of the ring even if the ring bore center is not precisely at the center of the outside diameter. After the gauging is complete, the two gage probes are retracted. Then the shot pin is retracted, releasing the ring to roll by gravity out of the gage and into a suitable receptacle or onto a conveyor belt (not shown).

The machine construction is very rigid in nature. The series combination of two stacked ball bearing assemblies, one tapered roller bearing assembly, and another ball bearing assembly for each of the spindles, makes possible the handling of high thrust loads as well as radial loads, at higher speeds. Endurance at speeds in excess of 2,000 RPM with thrust loads exceeding 10,000 pounds for more than ten minutes may be encountered. The use of hollow spindles enables establishment of flow of chips as well as cutting fluids axially through a spindle. Such flow can be established by oriented nozzles or by mounting the entire machine on an incline such that the turning axis is inclined and a gravity flow of chips and cutting fluid can be established through a spindle. It may be recognized that the machine is readily adaptable to grinding operations and other possible means of treating a workpiece.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A machine for simultaneously removing material from the outer and inner cylindrical surfaces of a ring at a work station in the machine and comprising:
   a first holder for a tool for treating the outer surface;
   a second holder for a tool for treating the inner surface;
   means coupled to said holders for driving the holders toward and away from a center of the work station;
   a loader associated with the work station to receive rings from a supply and deliver them sequentially to the work station;
   a ring rotater spindle having a rotational axis;
   a positioner associated with the work station for engaging the delivered ring and moving it from the loader to a position against the end of the rotater spindle;
   a ring locating spindle rotatable on the spindle axis; and
   first linear drive means coupled to the rotater spindle for moving the rotater spindle and the delivered ring and positioner therewith toward the locating spindle to grip the delivered ring between the rotater spindle and the locating spindle to enable the rotater spindle to rotationally drive the ring for treatment thereof.

2. The machine of claim 1 and wherein:
   the spindles are hollow to admit flow of fluids and removal of material from the ring through the spindles during treatment of the ring.

3. The machine of claim 1 and wherein:
   the spindles are supported in bearings accommodating rotational speeds in excess of 2000 RPM while enduring thrust loads in excess of 10,000 pounds continuously for ten minutes without overheating and without otherwise failing.

4. The machine of claim 1 and wherein:
   the positioner has a tapered centering surface thereon extending more than 180 degrees about the spindle axis.

5. The machine of claim 1 and further comprising:
   second linear drive means coupled to the positioner for moving the positioner and thereby moving the ring to the position against the rotater spindle end.

6. The machine of claim 5 and wherein the loader further comprises:
   a shuttle having a cradle to receive and hold a ring for transport to the work station;

a powered stop finger pivotally mounted to the shuttle and normally associated with the cradle to hold the ring in the cradle until clamped by the positioner against the rotater spindle, the finger being power-operable to open the cradle following clamping of the ring against the spindle end to enable departure of the cradle from the work station.

7. The machine of claim 5 and wherein:
the first and second linear drive means are powered such that the linear force delivery potential of the first exceeds that of the second, whereby the first linear drive means moves the rotater spindle and delivered ring toward the locating spindle while the second drive means urges the positioner against the driving force of the first drive means transmitted through the ring to the positioner.

8. The machine of claim 7 and wherein:
the second drive means are reversible to retract the positioner from the ring following contact of the ring with the locating spindle end.

9. The machine of claim 1 and further comprising:
a gage associated with the work station for receiving a ring after treatment at the work station and measuring the sizes of the outer and inner cylindrical surfaces of the treated ring.

10. The machine of claim 9 and wherein the gage further comprises:
a body having a passageway for the treated ring to move through the gage;
at least two locators on said body to engage the O.D. of the ring;
a wedge on the body and linearly movable to engage the ring with the locators;
a first sensor associated with the wedge to produce a signal responsive to the amount of linear movement of the wedge to indicate an O.D. measurement;
a tapered plug on the body and linearly movable to enter the I.D. of the ring and become wedged in the ring to stop; and
a second sensor associated with the plug to produce a signal responsive to the amount of linear movement of the plug to indicate an I.D. measurement.

11. The machine of claim 10 and wherein:
the plug has a longitudinal axis and is located on the body so that its axis passes through the center of the ring when the ring is engaged with the locators by the wedge to enable simultaneous measurement of I.D. and O.D. of the ring.

12. The machine of claim 11 and wherein:
at least one of the locators is a shot pin operable to alternately cross the passageway to stop the ring from passage through the passageway, and to then move out of the passageway to permit passage of the ring through the gage.

13. The machine of claim 12 and wherein:
the wedge, plug and shot pin are pneumatically driven.

14. The machine of claim 1 and further comprising:
a cylinder connected to and supporting one of the toolholders;
cylindrical bushings having an axis and supporting the cylinder for linear movement of the cylinder in the direction of the bushing axis.

15. The machine of claim 14 and wherein the cylinder is connected to and supports the first toolholder, the machine further comprising:

a slide housing having a bore receiving the cylinder therein;
the cylinder having two elongate grooves therein extending parallel to the longitudinal axis of the cylinder;
a first slide guide mounted in the housing and received in one of the grooves; and
a second slide guide mounted in the housing and received in the other of the grooves, whereby the cylinder is prevented from rotation in the housing.

16. The machine of claim 15 and wherein:
at least one of the guides is adjustable to apply a load on the cylinder transverse to the longitudinal axis of the cylinder.

17. The machine of claim 15 and further comprising:
circular seals in the housing and sealing the cylinder to the housing around the cylinder beyond opposite ends of the grooves in the cylinder.

18. A turning and boring machine comprising:
an elongate base;
first, second and third stands secured to the base;
four parallel cylindrical shafts secured to the stands, a lower two of the shafts being horizontally spaced from each other and vertically spaced from the base,
an upper two of the shafts being horizontally spaced from each other and substantially above the lower shafts;
a clamp plate between the first and second stand and slidably and guidingly mounted on the shafts for movement longitudinally of the shafts;
fluid drive means to drive the clamp plate toward and away from the first stand;
a clamp cylinder rotatably mounted in the clamp plate and defining a turning axis parallel to the shafts;
a workpiece centering member, mounted to the second stand and centered on the turning axis, the mounting being through a second fluid drive means secured to the second stand to drive the centering member toward and away from the clamp cylinder;
an external turning tool mounting member;
an external tool slide connected to the mounting member;
an external tool slide holder connected to the slide and guidably received on one of the upper shafts;
an external tool slide holder drive bar slidably received in the first and second stands;
a ball nut secured to the drive bar;
a ball screw rotatably mounted to the first stand but axially immovable relative to the first stand;
a turning tool $Y_1$-axis drive motor coupled to the ball screw;
an $X_1$-axis drive screw mounted to the external turning tool slide holder and axially immovable relative thereto;
an $X_1$-axis slide drive nut received on the $X_1$-axis drive screw;
a boring bar $Y_2$-axis carriage mounted on the two lower shafts;
a ball nut fastened to the $Y_2$-axis carriage;
a $Y_2$-axis ball screw rotatably mounted to the third stand and axially immovable relative to the third stand;
a $Y_2$-axis carriage drive motor secured to the base and coupled to the $Y_2$-axis ball screw for driving the $Y_2$-axis carriage toward and away from the first stand;

an $X_2$-axis drive carriage mounted to the $Y_2$-axis drive carriage and vertically movable relative to the $Y_2$-axis drive carriage;

a ball nut fastened to the $X_2$-axis drive carriage;

an $X_2$-axis boring bar drive carriage drive screw fastened to the $Y_2$-axis drive carriage and axially immovable but rotatable therein;

a boring bar fixed to the $X_2$-axis drive carriage;

an $X_2$-axis carriage drive motor coupled to the $X_2$-axis carriage drive screw to drive the boring bar in a direction transverse to the turning axis;

a boring tool mounted to a distal end of the boring bar and drivable along the turning axis by the $Y_2$-axis carriage drive motor and drivable transverse to the turning axis by the $X_2$-axis carriage drive motor.

19. The machine of claim 18 wherein:

the external tool mounting member slide is cylindrical.

20. The machine of claim 18 and wherein the centering member has a chamfered edge to engage a ring-shaped workpiece and center the workpiece on the turning axis as the centering member is advanced toward the clamp cylinder.

21. The machine of claim 20 and wherein:

the fluid drive force potential of the first-mentioned fluid drive means exceeds the fluid drive force potential of the second-mentioned fluid drive means.

22. The machine of claim 18 and further comprising a loader for feeding ring-shaped workpieces toward the turning axis, the loader comprising:

a guide shaft mounted on one of the lower shafts;

workpiece support shuttle slidably mounted on the guide shaft and having a cradle reciprocable toward and away from the turning axis and operable from a stock receiver position toward a standby position adjacent the clamp cylinder and then to a third and discharge position on the turning axis to place workpieces, one-at-a-time, in position between the clamp cylinder and the centering member to enable the centering member to cooperatively engage and clamp the workpiece between the clamp cylinder and the centering member.

23. The machine of claim 18 and wherein:

the external tool slide holder includes a slide base;

a slide housing is mounted on the base and has a bore therethrough with bearings therein having a common axis;

the external tool slide includes a cylinder fittingly received in the bearings, the cylinder having two diametrically opposed elongate grooves extending parallel to the longitudinal axis of the cylinder;

a first slide guide roller is mounted in the slide housing and is received in one of the grooves; and a second slide guide roller is mounted in the slide housing and is received in the other of the grooves, whereby the slide is prevented from rotating in the housing.

24. The assembly of claim 23 and wherein:

at least one of the guide rollers is adjustable to apply a transverse load of the cylinder against the slide housing bearings.

25. The assembly of claim 23 and wherein:

the first roller is mounted to rotate on an axis perpendicular to the axis of the bearings; and the second roller is mounted to rotate on an axis parallel to and spaced longitudinally of the cylinder from the rotational axis of the first roller.

26. The assembly of claim 25 and further comprising:

a circular disc mounted in a circular opening in the slide housing and having a center on the axis of the first roller, the second roller being mounted on the disc; and set screws threaded in the slide housing and bearing on spaced points on the disc to enable operating the setscrews to turn the disc in the opening and thereby move the second roller against the wall of the other groove in the cylinder to change the fit of the cylinder in the bearings.

* * * * *